Nov. 16, 1926.  1,607,506
L. T. BIRON ET AL
GASOLINE GAUGE
Filed August 7, 1922   2 Sheets-Sheet 1

LOUIS T. BIRON
MARTIN WEYENBERG
ALVIN C. WOLTERS
INVENTOR

BY Victor J. Evans
ATTORNEY

Nov. 16, 1926. 1,607,506
L. T. BIRON ET AL
GASOLINE GAUGE
Filed August 7, 1922   2 Sheets-Sheet 2

Louis T. Biron
Martin Weyenberg
Alvin C. Wolters
INVENTORS by Victor J. Evans
ATTORNEY Patented Nov. 16, 1926.

1,607,506

UNITED STATES PATENT OFFICE.

LOUIS T. BIRON, MARTIN WEYENBERG, AND ALVIN C. WOLTERS, OF APPLETON, WISCONSIN.

GASOLINE GAUGE.

Application filed August 7, 1922. Serial No. 580,334.

This invention relates to gauges and more particularly to a float operated gasoline gauge adapted for use in connection with motor vehicles, and an object of the invention is to provide a novel type of gauge mechanism which will accurately indicate the quantity of gasoline or analogous liquid in a tank or reservoir, at all times, and also a gauge which embodies a visual signal automatically operated at pre-determined times for directing attention to the gauge.

Another object of this invention is to provide a gauge as specified which embodies, in combination with a mechanically operated indicating hand and dial, an electrically operated light, energized at pre-determined times for directing attention to the gauge, said light, preferably, being energized when the gasoline or fuel in the tank falls below a certain pre-determined amount.

Other objects of the invention will appear in the following detailed description taken in connection with the accompanying drawings wherein.

Figure 1:
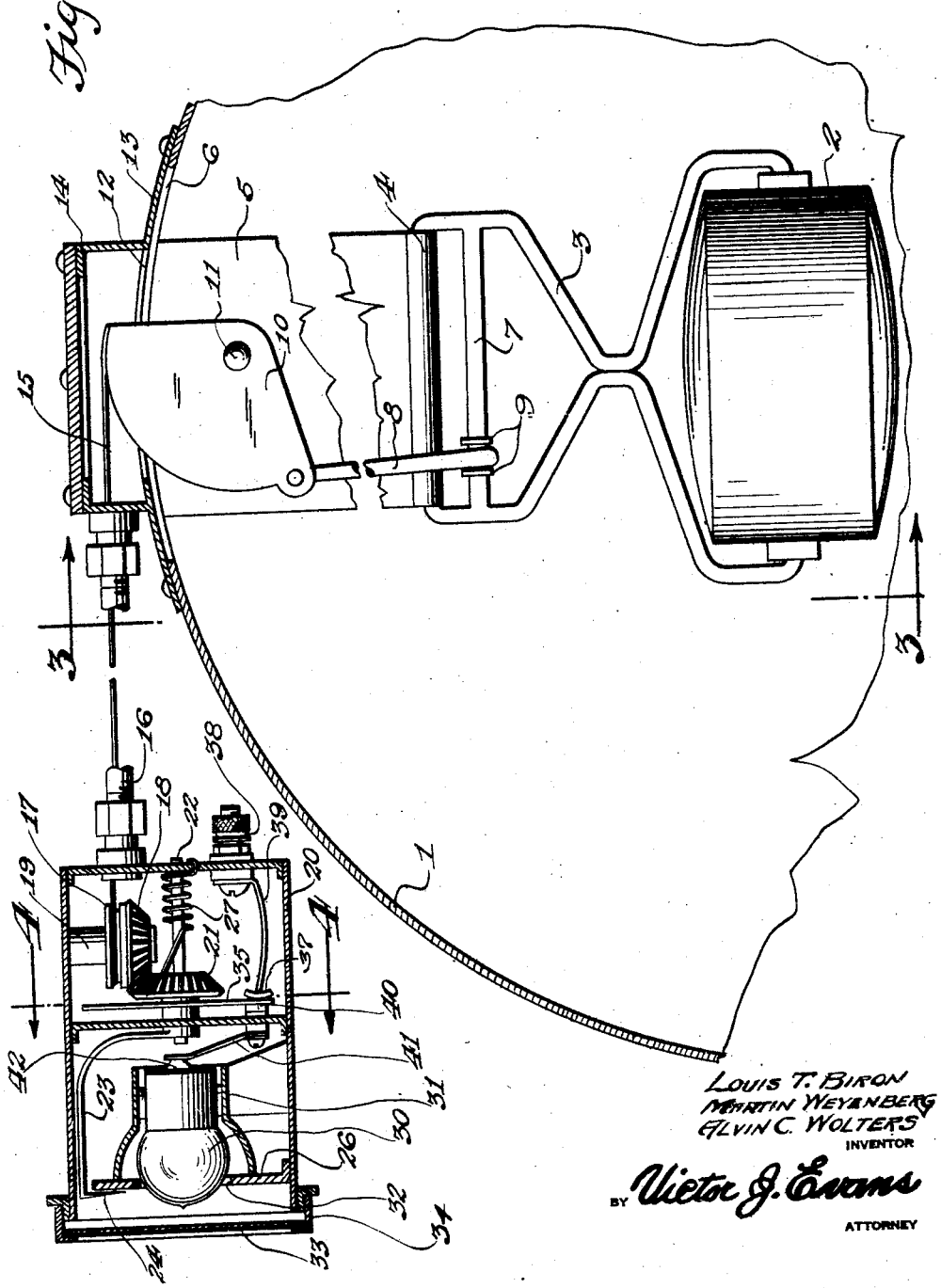
Fig. 1 is a sectional view through the improved gauge.
Figure 2:
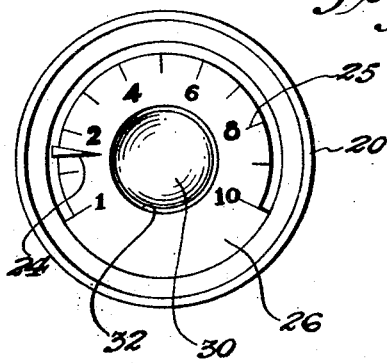
Fig. 2 is a detail view of the dial and hand cooperating therewith.
Figure 4:
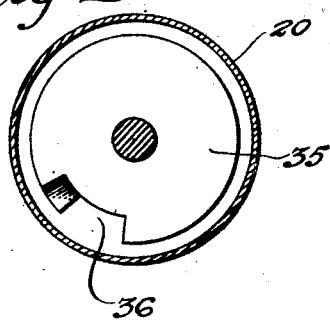
Fig. 4 is a section on the line 4—4 of Fig. 1.
Figure 3:
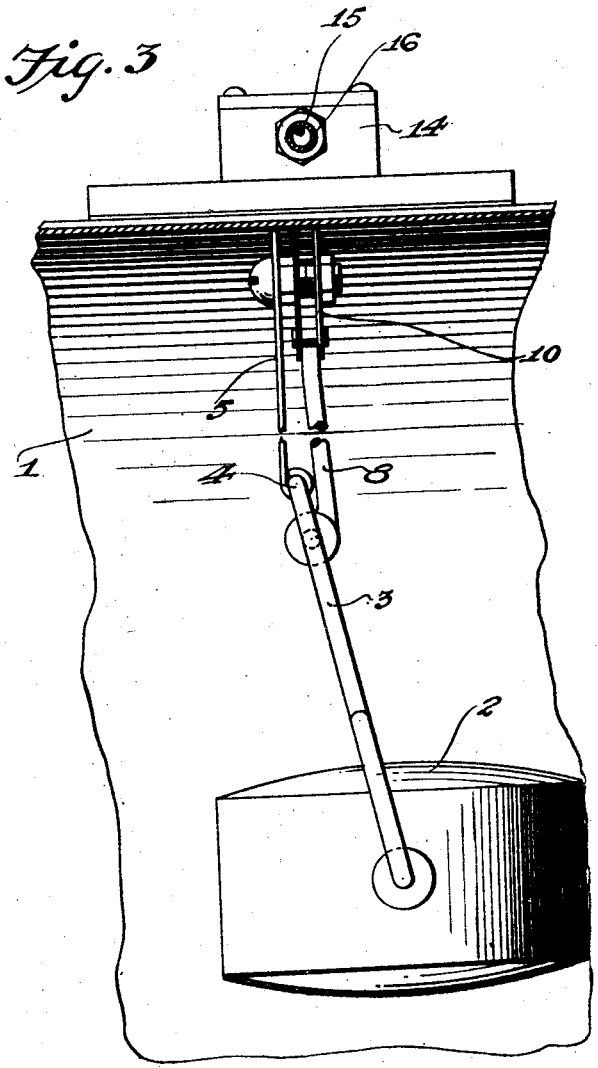
Fig. 3 is a vertical section on the line 3—3 of Fig. 1.

Referring more particularly to the drawings, the improved gauge is adapted to be used in connection with the gasoline or fuel tank 1 of a motor vehicle or analogous device, and the gauge comprises a float 2 adapted to rest upon fuel in the tank 1. The float 2 is carried by an arm structure 3 pivotally supported at 4 by a supporting plate 5 which extends into the tank 1 through a suitable opening 6. The supporting arm structure 3 has a cross rod 7 formed thereon to which a lever 8 is pivotally connected. The lever 8 is prevented from longitudinal movement on the arm 7 by collars 9. The end of the lever 8 remote from the rod 7 is pivotally connected to one end of a quadrant 10 which is in turn pivotally supported upon a suitable pivoting bolt or member 11. The quadrant 10 projects through the opening 6 and through the opening 12 in the cover plate 13 into the housing 14 and it has a wire or analogous flexible member 15 connected thereto which projects outwardly through the housing 14 and through a suitable housing tube 16. The wire, cable or flexible member 15 is connected to the collar 17 formed upon the bevel gear 18, and the bevel gear 18 is rotatably supported by a stub shaft 19. The stub shaft 19 is carried by a suitable housing 20 which is adapted to be mounted upon the dash or instrument board (not shown) of the vehicle equipped with the gauge. The bevel gear 18 meshes with a second bevel gear 21, upon the shaft 22. An indicating hand 23 is also carried by the shaft 22. The indicating hand 23 has its pointed end 24 bent transversely for cooperation with the graduations 25 on the dial 26. A spring 27 is connected to the bevel gear 21 and to the housing 20, for urging the bevel gears 18 and 21 into normal position for positioning the point 24 of the indicating hand 23 at or below the lowest graduation 25 on the dial 26. As the float 2 rises in the tank 1, it will rock the quadrant 10 which will rotate the bevel gears 18 and 21, against the tension of the spring 27 and move the indicating hand 23 for positioning its pointed end 24 at the graduation 25 indicating the quantity of fuel in the tank 1.

It is desirable, to attract attention to the indicator when the quantity of fuel reaches a dangerously low level and to provide for this purpose, an incandescent electric light bulb 30 is provided which is carried by a socket structure 31 of any approved type. The dial 26 is provided with a central opening 32 through which the bulb 30 projects so that when the bulb is illuminated, it will light up the gauge and attract attention thereto. A suitable lens 33 is positioned in front of the dial 26 and the bulb 30 and it is pivotally connected to the housing 20 by means of the screw threaded cap 34.

The bulb 30 is automatically energized at the proper time through the medium of a circuit closing mechanism comprising a disc 35 of insulation which has an arcuate cut out portion 36 formed therein. A brush or shoe 37 engages one side of the disc 35 and is connected to the binding post 38 by a flexible connector 39. A contact 40 is carried by the housing 20 and has a spring contact arm 41 connected thereto which engages the central contact 42 of the bulb 30. When the float 2 falls below a pre-determined point in the tank 1, the disc 35 will be rotated to bring the cut out portion 36 in alignment with the brush 37 and contact 40 which will permit engagement of the contacts for closing an electric circuit through the bulb 30. It is to be understood that the socket 31 may be grounded in the usual manner to permit the proper energizing of the light bulb.

It is, of course, to be understood that the invention may be constructed in other manners and the parts associated in different relations and, therefore, we do not desire to be limited in any manner except as set forth in the claims hereunto appended.

Having thus described our invention what we claim is:—

1. A device of the class described including a dial having a central opening formed therein, a socket structure carried by the dial, illuminating means mounted in the socket structure and projecting through the opening, an indicator arm having an end portion moving over and around the dial, mechanism for operating the indicator arm including a grooved member, an operative connection between the grooved member and indicator arm, a float, and a flexible member providing a connection between the float and grooved member to effect operation of the indicator arm, and circuit closing mechanism for said illuminating means operable with said operating mechanism.

2. In a gauge construction indicating mechanism comprising a dial, a bulb contiguous to the dial, a hand operating over the dial, gears for turning said hand, a disc associated with one of the gears having a cut-out portion and a circuit for the bulb including a pair of contacts normally separated by the disc but coming into engagement with each other upon registration with the cut-out portion of the disc.

3. A device of the class described including a dial, means for illuminating said dial, an indicator arm having an end portion working over and around the dial, mechanism for operating said indicator arm including a float having operative connection to the indicator arm, and circuit closing mechanism for the illuminating means including a disk member formed of insulating material having a cut out portion operative with the operating mechanism, contact elements disposed on opposite sides of the disk member in the path of the cut out portion, and a connection between the illuminating means and one of the contact elements.

In testimony whereof we affix our signatures.

MARTIN WEYENBERG.
ALVIN C. WOLTERS.
LOUIS T. BIRON.